United States Patent
Zhang et al.

(10) Patent No.: US 11,961,669 B2
(45) Date of Patent: Apr. 16, 2024

(54) STRETCHABLE SUPERCAPACITORS WITH VERTICALLY-ALIGNED EMBEDDED CARBON NANOTUBES

(71) Applicant: The Trustees of the Stevens Institute of Technology, Hoboken, NJ (US)

(72) Inventors: Runzhi Zhang, Hoboken, NJ (US); Junjun Ding, Hoboken, NJ (US); Eui-Hyeok Yang, Fort Lee, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 834 days.

(21) Appl. No.: 16/610,066

(22) PCT Filed: May 2, 2018

(86) PCT No.: PCT/US2018/030744
§ 371 (c)(1),
(2) Date: Oct. 31, 2019

(87) PCT Pub. No.: WO2018/204551
PCT Pub. Date: Nov. 8, 2018

(65) Prior Publication Data
US 2021/0005400 A1  Jan. 7, 2021

Related U.S. Application Data

(60) Provisional application No. 62/500,041, filed on May 2, 2017.

(51) Int. Cl.
| | |
|---|---|
| *B32B 9/00* | (2006.01) |
| *C01B 32/162* | (2017.01) |
| *C08J 5/12* | (2006.01) |
| *H01G 11/36* | (2013.01) |
| *H01G 11/56* | (2013.01) |

(Continued)

(52) U.S. Cl.
CPC ............ *H01G 11/86* (2013.01); *C01B 32/162* (2017.08); *C08J 5/12* (2013.01); *H01G 11/36* (2013.01);
(Continued)

(58) Field of Classification Search
CPC ............................ Y10T 428/30; B82Y 30/00
(Continued)

(56) References Cited

U.S. PATENT DOCUMENTS

| 8,685,287 B2 | 4/2014 | Worsley et al. |
| 10,224,153 B2 * | 3/2019 | Yin ................. H01G 11/38 |

(Continued)

OTHER PUBLICATIONS

International Preliminary Report on Patentability dated Nov. 14, 2019 in PCT/US2018/030744. (7 pages).
(Continued)

*Primary Examiner* — Daniel H Miller
(74) *Attorney, Agent, or Firm* — Clark Hill PLC; Ralph W. Selitto; John K. Kim

(57) ABSTRACT

Flexible and stretchable supercapacitors are made using carbon nanostructures produced by providing a first composite structure which includes a temporary substrate and an array of carbon nanotubes arranged in a stack on a surface of the temporary substrate such that the stack of carbon nanotubes is oriented generally perpendicular to the surface of the temporary substrate, which may include silicon dioxide. The stack of carbon nanotubes is transferred from the temporary substrate to another substrate, which includes a curable polymer, thereby forming another composite structure comprising the stack of carbon nanotubes and the cured polymer.

19 Claims, 2 Drawing Sheets

(51) Int. Cl.
  *H01G 11/58* (2013.01)
  *H01G 11/86* (2013.01)
  *B82Y 30/00* (2011.01)

(52) U.S. Cl.
  CPC ............. *H01G 11/56* (2013.01); *H01G 11/58* (2013.01); *B82Y 30/00* (2013.01); *C01B 2202/08* (2013.01); *C08J 2383/04* (2013.01); *Y10T 428/30* (2015.01)

(58) Field of Classification Search
  USPC .......................................... 428/408; 423/448
  See application file for complete search history.

(56) References Cited

U.S. PATENT DOCUMENTS

| | | |
|---|---|---|
| 2008/0170982 A1 | 7/2008 | Zhang et al. |
| 2010/0140591 A1 | 6/2010 | Nicholas et al. |
| 2010/0304101 A1* | 12/2010 | Lin ........................ B82Y 30/00 |
| | | 156/322 |
| 2011/0204020 A1* | 8/2011 | Ray ........................ H01G 11/36 |
| | | 977/773 |
| 2012/0121986 A1* | 5/2012 | Balu ..................... H01M 4/625 |
| | | 977/948 |
| 2015/0098167 A1 | 4/2015 | El-Kady et al. |
| 2016/0033343 A1 | 2/2016 | Park et al. |
| 2019/0002284 A1* | 1/2019 | Inoue .................... C01B 32/158 |

OTHER PUBLICATIONS

Written Opinion of the International Searching Authority dated Jul. 11, 2018 in PCT/US2018/030744. (5 pages).
International Search Report dated Jul. 11, 2018 in PCT/US2018/030744. (2 pages).
U.S. Appl. No. 16/541,054, filed Aug. 14, 2019. (26 pages).

\* cited by examiner

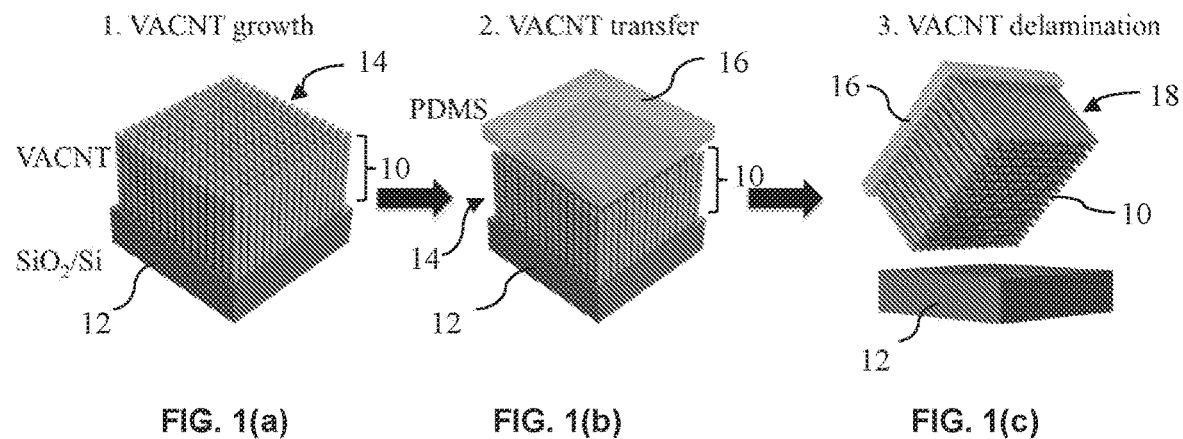
FIG. 1(a)  FIG. 1(b)  FIG. 1(c)
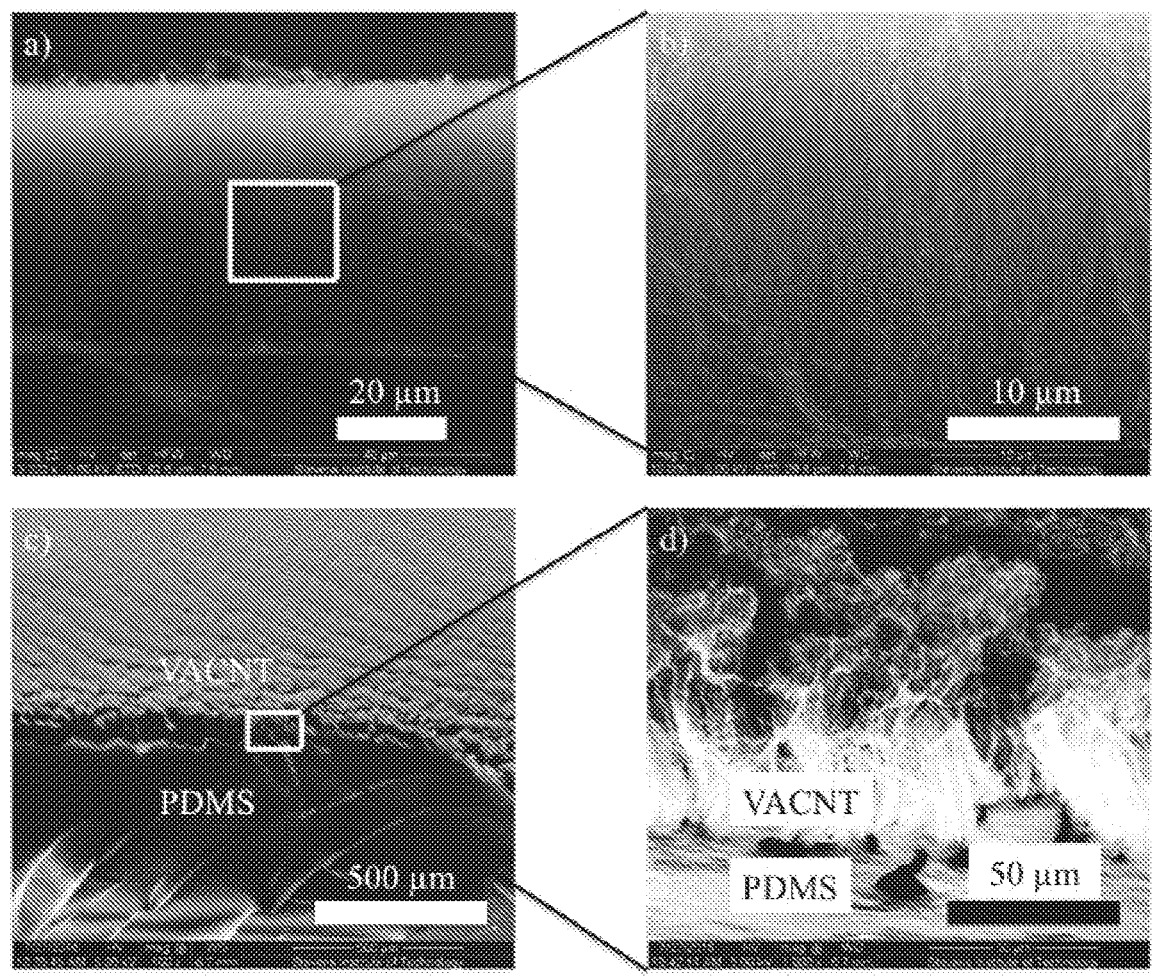
FIG. 2(a)  FIG. 2(b)
FIG. 2(c)  FIG. 2(d)

FIG. 3(a)
FIG. 3(c)
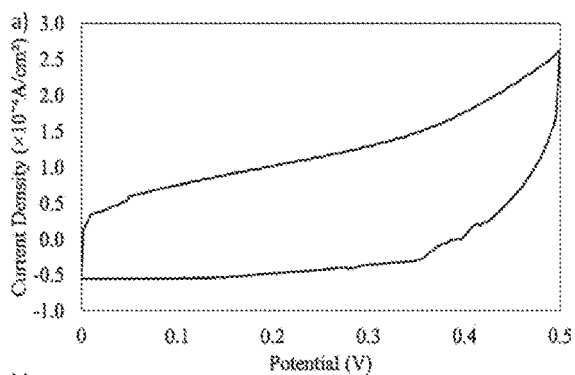
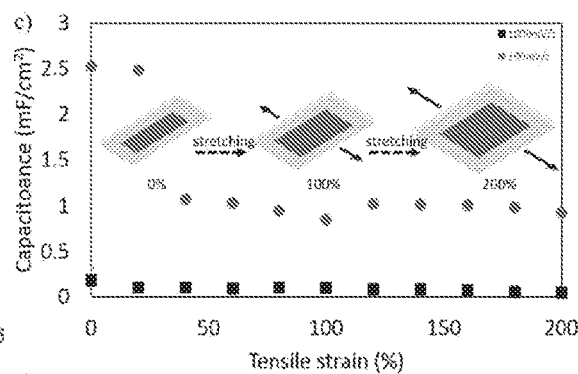
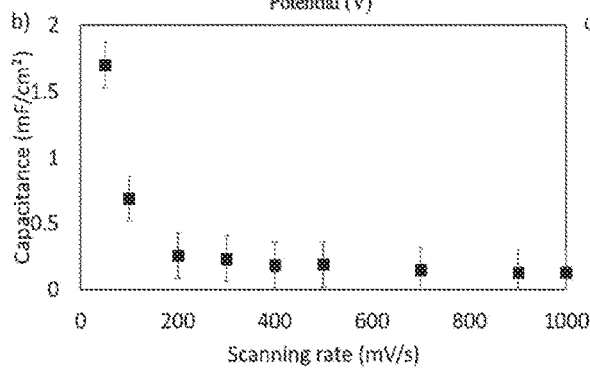
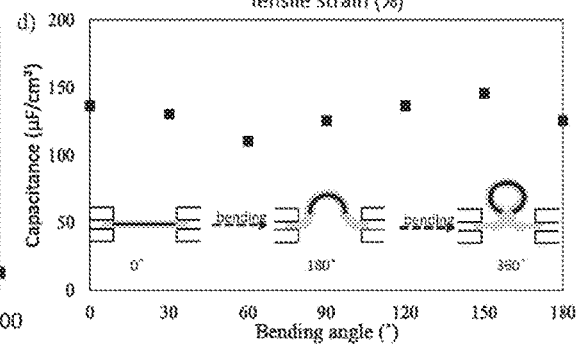
FIG. 3(b)
FIG. 3(d)

STRETCHABLE SUPERCAPACITORS WITH VERTICALLY-ALIGNED EMBEDDED CARBON NANOTUBES

CROSS REFERENCE TO RELATED APPLICATIONS

This application claims priority to International Application No. PCT/US18/30744, filed May 2, 2018 and entitled "STRETCHABLE SUPERCAPACITORS WITH VERTICALLY-ALIGNED EMBEDDED CARBON NANOTUBES" which claims priority to U.S. Provisional Patent Application Ser. No. 62/500,041 filed May 2, 2017, the entire disclosures of which applications are incorporated herein by reference in their entireties.

FIELD OF THE INVENTION

The present invention relates to the field of supercapacitors and methods of making supercapacitors, and, more specifically, to flexible and stretchable supercapacitors that include carbon nanostructures.

BACKGROUND OF THE INVENTION

The increasing depletion of fossil fuels and the environmental problems caused by those fossil fuels have motivated researchers to develop new types of clean energy, such as solar, wind, and water energy. As these new energy sources are limited by time or location (water, wind, and solar power), energy storage devices are required to ensure continued power supply. Supercapac tors, as one type of energy storage device, have received intensive attention owing to their high power density, fast charge/discharge, and long charge/discharge cycles.

Flexible electronics have a wide range of applications in wearable and multifunctional electronics, including flexible displays, electronic skins, and implantable medical devices. Flexible supercapacitors, with good mechanical compliance, can meet the requirements for light-weight, portable and flexible devices.

Carbon nanotubes are a promising electrode material for flexible supercapacitors owing to their excellent properties. However, the fabrication of flexible supercapacitors in large quantities can be a complicated process. For example, to apply electrode materials onto flexible substrates, researchers have used direct-coating methods which rely heavily relies on the physical adhesion of the electrode materials on the substrate, or stacking the electrode and electrolyte. It has been found, however, that the electrode/substrate interface resulting from such fabrication methods can delaminate under large strain, thereby limiting the flexibility of the supercapacitors produced thereby and consequently deteriorating their performance.

SUMMARY OF THE INVENTION

In one embodiment, a method according to the present invention enables the facile fabrication of flexible supercapacitors using polydimethylsiloxane (PDMS) to infiltrate between an array of carbon nanotubes, thereby achieving strong adhesion between the PDMS and the vertically aligned carbon nanotubes (VACNTs) due to the viscoelastic property of PDMS which promotes the adhesion between the VACNTs and PDMS. In accordance with this embodiment, the present invention enables facile fabrication of flexible supercapacitors at a high rate of throughput.

In accordance with another embodiment of the present invention, a flexible and stretchable supercapacitor includes VACNTs in a curable polymer (e.g., PDMS), with the VACNTs/PDMS composite structure functioning as an electrode for flexible supercapacitors. After assembling the electrode with liquid or solid electrolyte, the flexible supercapacitors, acting as energy storage devices, can be integrated into flexible electronics. In such applications of the present invention, the VACNTs/PDMS composite structures produced in accordance with the present invention maintain their structural integrity under tensile strains over 1000 charge/discharge cycles without major degradation of their functionality.

BRIEF DESCRIPTION OF THE FIGURES

For a better understanding of the present invention, reference is made to the following detailed description of various exemplary embodiments considered in conjunction with the accompanying Figures, in which like structures are referred to by the like reference numerals throughout the several Figures, and in which:

FIGS. 1(*a*)-(*c*) represent a sequence of schematic illustrations depicting one example of a process that can be employed to construct a VACNT/PDMS stack for use in flexible supercapacitors fabricated according to an embodiment of the present invention;

FIGS. 2(*a*)-(*d*) represent a set of SEM images of CVD-grown VACNTs on a silicon dioxide ($SiO_2$) substrate (see FIG. 2(*a*) and FIG. 2(*b*)), and VACNTs successfully transferred on PDMS (see FIG. 2(*c*) and FIG. 2(*d*)), in which the structure shown in the SEM images was obtained by delaminating the VACNT/PDMS stack from the $SiO_2$ substrate during a fabrication process according to an embodiment of the present invention;

FIGS. 3(*a*)-(*d*) represent a group of charts illustrating an electrochemical characterization of a VACNTs/PDMS stack under tensile strain and bending, and more particularly, showing: in FIG. 3(*a*), a chart of cyclic voltammetry data at a scan rate of 1 V/s; in FIG. 3(*b*), a chart of capacitances at scan rates ranging from 50 mV/s to 1 V/s; in FIG. 3(*c*), a chart of capacitances under strains of up to 200% at the scan rates of 100 mV/s and 1 V/s; and in FIG. 3(*d*), a chart of capacitances under bending, the angles of bending ranging from 0 to 180 degrees.

DETAILED DESCRIPTION OF THE INVENTION

With initial and general reference to FIGS. 1-3 and the accompanying text which follows, it is noted that terms indicating position, orientation or direction of motion are used throughout the discussion of FIGS. 1-3 for the purpose of facilitating discussion only, and not to limit the disclosed embodiments to the particular terms described herein. Nor do they limit the physical orientation in actual use to any particular coordinate system (e.g., horizontal, vertical and front, back and side).

It should also be noted that the following disclosure is presented to provide an illustration of the general principles of the present invention and is not meant to limit, in any way, the inventive concepts disclosed and claimed herein. All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", and "the" include the plural referents unless otherwise stated. Additionally, the terms "comprises", "comprising", "includes", "including", "has" and the like, when used herein specify that certain features are present in that embodiment, however, such terms should not be interpreted to preclude the presence or addition of additional steps, operations, features, components, and/or groups thereof.

With the foregoing prefatory comments in mind, embodiments of the present invention include a facile fabrication method utilizing VACNT carpets. Such a method enables high-throughput fabrication of supercapacitors that are flexible and stretchable. The inventive method provides a strong adhesion between VACNT carpets and PDMS, which facilitates a stable charge/discharge cycle under various tensile strain conditions. Such performance characteristics enhance the practicality of including the VACNTs/PDMS structures of the present invention in flexible supercapacitors. The VACNTs/PDMS structures possess a very high surface area, which contributes to the unexpectedly high capacitance of the flexible supercapacitors produced in accordance with the present invention.

Referring initially to FIGS. 1(a)-(c), the first step of an exemplary embodiment of a fabrication method according to the present invention involves growing a dense carpet-like structure of VACNTs 10 on a wafer-like $SiO_2$/Si substrate 12 using atmospheric pressure chemical vapor deposition (APCVD). More particularly, the $SiO_2$/Si substrate 12 illustrated schematically in FIGS. 1(a)-(c) is a $SiO_2$/Si wafer with 5 nm thick Al and 3 nm thick Fe as catalyst deposited on its surface by physical vapor deposition (PVD). After placing the $SiO_2$/Si substrate 12 in an APCVD chamber (not shown), its furnace temperature is increased to 750° C. with 500 sccm Ar flow. VACNTs are grown in the APCVD chamber at 750° C. for 15 minutes ith 60 sccm $H_2$ and 100 sccm $C_2H_4$. The APCVD chamber is then cooled down to room temperature while keeping the Ar flowing. The resulting dense carpet-like structure of VACNTs 10 (see FIGS. 2(a)-(d)) formed by this exemplary method are aligned vertically relative to the surface of the $SiO_2$/Si substrate 12, which substrate 12 is considered for the purpose of the present example to be horizontal, thereby forming a composite structure 14 consisting essentially of the carpet-like structure of VACNTs 10 and the $SiO_2$/Si substrate 12. In embodiments of the present invention, other methods of forming VACNTs may be used in place of the exemplary method discussed above.

The next step of the exemplary method is to transfer the carpet-like structure of VACNTs 10 onto PDMS or another polymer before the polymer fully cures. To form a suitable PDMS structure 16, a PDMS base and a suitable curing agent (e.g., Sylgard 184 Silicone Elastomer, Dow Corning) are mixed in a ratio of 10:1 (PDMS base:curing agent), and degassed under reduced pressure in a vacuum pump to remove bubbles from the liquid mixture. The liquid mixture is then heated on a hot plate at 65° C. for about 30 minutes. The previously formed composite structure 14 (i.e., the carpet-like structure of VACNTs 10 and the $SiO_2$/Si substrate 12) is placed face-to-face onto the PDMS structure 16 before the PDMS is fully cured. Once the PDMS is fully cured, the result is a VACNTs/PDMS composite structure 18 that can be peeled off (i.e., delaminated) from the $SiO_2$/Si substrate 12.

In embodiments of the present invention, the VACNTs/PDMS composite structure 18 functions as an electrode for flexible supercapacitors, with the electrolyte for such flexible supercapacitors being either an ionic-liquid or a solid. In an exemplary embodiment of the present invention, a solid electrolyte can be fabricated by mixing polyvinyl alcohol powder and potassium hydroxide (KOH) in deionized water, while also evaporating the excess water to obtain a gel electrolyte. To create all-solid-state flexible supercapacitors according to embodiments of the present invention, the gel electrolyte is sandwiched between a pair of the VACNTs/PDMS composite structures 18.

Referring to FIGS. 3(a)-(d), the electrochemical properties of the VACNTs/PDMS composite structures 18 made using methods according to the present invention were measured in 30% KOH using cyclic voltammetry (CV) in a three electrode configuration. Platinum (Pt) foil was used as a counter electrode and Ag/AgCl (saturated KCl) as the reference electrode. CV measurements were performed within the potential range of 0.0V-0.5V at scan rates of 50-1000 mV/s. The capacitances of the electrodes were calculated as a capacitance per area ($F/cm^2$). The average capacitance was normalized per area of the samples and was estimated according to the following equation.

$$C = \frac{\int_{E_1}^{E_2} I \, dV}{V \times \Delta V \times A}$$

where I is the current, A is the area of the supercapacitor, $\Delta V$ is the scanning rate, $E_1$ and $E_2$ are the voltage and $V=E_2-E_1$.

To evaluate the flexibility and durability of the VACNTs/PDMS composite structures 18, both tensile strain measurements and bending strain measurements were performed. Such measurements were made as the VACNTs/PDMS composite structures 18 were stretched from 0% to 20% and bent from 0 to 180 degrees.

The VACNTs/PDMS composite structures 18 exhibited good electrochemical stability and capacitive behaviors at scanning rates from 50 mV/s to 1 V/s. The measured capacitance (see FIG. 3(a) and FIG. 3(b)), which has an area of 0.54 $cm^2$, was approximately 170 $\mu F/cm^2$ at a high scan rate of 1 V/s. In addition, the strong adhesion between the VACNTs and the PDMS enabled the VACNTs/PDMS structures 18 to sustain various bending and tensile strains (see FIG. 3(c) and FIG. 3(d)). The VACNTs/PDMS composite structures 18 could be bent up to 180 degrees, and the capacitance under such strains was consistent under bending angles in the range of 0 to 180 degrees. The maximum tensile strain was 200% (see FIG. 3(c)). Further tests have demonstrated that the capacitance of the VACNTs/PDMS composite structures 18 can remain consistent under tensile strains of at least 300%.

Flexible supercapacitors that include the VACNTs/PDMS composite structures 18 made using methods according to embodiments of the present invention are expected to have applications in, for example, the fields of wearable electronics, flexible photovoltaics (e.g., rolled-up displays), self-powered wearable optoelectronics, and electronic skins.

It will be understood that the embodiments of the present invention described herein are merely exemplary and that a person skilled in the art may make many variations and modifications without departing from the spirit and scope of the invention. All such variations and modifications are intended to be included within the scope of the invention, as defined in the following claims.

We claim:

1. A method of fabricating a flexible and stretchable supercapacitor, comprising the steps of:
providing a first composite structure which includes a first substrate and an array of carbon nanotubes arranged on a surface of said first substrate such that said array of carbon nanotubes is oriented generally perpendicular to said surface of said first substrate and such that each of said carbon nanotubes has a first end removably embedded in said first substrate and a second end distal to said first substrate;
providing a second substrate which includes a curable precursor of a polymer selected to have viscoelastic properties;
providing said second substrate with a curing agent for said precursor;
partially curing said precursor of said second substrate such that said second substrate includes a partially cured polymer;
placing said array of carbon nanotubes into contact with said second substrate, while said array of carbon nanotubes is still arranged on said surface of said first substrate, such that said second end of each of said carbon nanotubes is partially embedded in said partially cured polymer of said second substrate before said partially cured polymer is fully cured and such that said partially cured polymer infiltrates between said carbon nanotubes of said array of carbon nanotubes;
fully curing said partially cured polymer while said second end of each of said carbon nanotubes is partially embedded therein, thereby forming a fully cured polymer that adheres to said second ends of said carbon nanotubes of said array of carbon nanotubes and thereby also forming a second composite structure in the form of a laminate which includes said first substrate, said second substrate and said array of carbon nanotubes between said first and second substrates;
delaminating said second composite structure by peeling said first substrate away from said array of carbon nanotubes to thereby remove said first ends of said carbon nanotubes from said first substrate and to thereby form a third composite structure which includes said array of carbon nanotubes and said second substrate, but not said first substrate, said third composite structure including said first ends of said carbon nanotubes; and
incorporating said third composite structure into an electrode adapted for use in a flexible supercapacitor.

2. The method of claim 1, wherein said first substrate includes silicon.

3. The method of claim 1, wherein said first substrate includes silicon dioxide.

4. The method of claim 1, wherein said first substrate has a wafer-like structure made from silicon or silicon dioxide.

5. The method of claim 4, wherein said wafer-like structure includes a catalyst which is applied thereto by physical vapor deposition.

6. The method of claim 5, wherein said catalyst is selected from the group consisting of aluminum and iron.

7. The method of claim 1, wherein said array of carbon nanotubes is grown on said first substrate in an atmospheric pressure chemical vapor deposition chamber.

8. The method of claim 7, wherein said array of carbon nanotubes is grown at a temperature of 750° C. for 15 minutes.

9. The method of claim 8, wherein said array of carbon nanotubes is grown into a dense carpet-like structure.

10. The method of claim 1, wherein said polymer is polydimethylsiloxane and said curing agent is a silicone elastomer.

11. The method of claim 1, wherein said electrode is combined with an electrolyte to form said flexible supercapacitor.

12. The method of claim 11, wherein said electrolyte is an ionic liquid.

13. The method of claim 11, wherein said electrolyte is a solid.

14. The method of claim 11, wherein said electrolyte is a gel.

15. The method of claim 11, wherein said electrolyte comprises polyvinyl alcohol powder, potassium hydroxide and deionized water.

16. The method of claim 1, wherein said third composite structure maintains structural integrity under tensile strains up to 300%.

17. The method of claim 1, wherein said third composite structure retains its functionality over 1000 charge and discharge cycles.

18. The method of claim 10, further comprising the step of mixing said polymer and said curing agent together in a ratio of 10:1, respectively.

19. The method of claim 1, wherein said third composite structure is stretchable from 0% to 20% and bendable from 0° to 180°.

* * * * *